United States Patent
Mauger et al.

(10) Patent No.: US 7,046,669 B1
(45) Date of Patent: May 16, 2006

(54) COMMUNICATIONS NETWORK

(75) Inventors: Roy Mauger, Radlett (GB); Dave Stacey, Stansted Abbotts (GB); Mark Gibson, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 673 days.

(21) Appl. No.: 09/606,052

(22) Filed: Jun. 28, 2000

(51) Int. Cl.
H04L 12/28 (2006.01)
H04L 12/56 (2006.01)

(52) U.S. Cl. ...................... 370/393; 370/401; 370/351

(58) Field of Classification Search ............... 370/393, 370/392, 389, 351, 352, 400, 401, 408, 395.2, 370/395.21, 395.52, 229, 231, 254, 395.42
See application file for complete search history.

(56) References Cited

U.S. PATENT DOCUMENTS

| | | | | |
|---|---|---|---|---|
| 6,026,077 A * | 2/2000 | Iwata | ......................... | 370/254 |
| 6,205,488 B1 * | 3/2001 | Casey et al. | ................. | 709/238 |
| 6,301,244 B1 * | 10/2001 | Huang et al. | ............... | 370/351 |
| 6,341,127 B1 * | 1/2002 | Katsube et al. | ............. | 370/352 |
| 6,408,001 B1 * | 6/2002 | Chuah et al. | ............... | 370/392 |
| 6,501,754 B1 * | 12/2002 | Ohba et al. | .................. | 370/389 |
| 6,574,224 B1 * | 6/2003 | Brueckheimer et al. | . | 370/395.6 |
| 6,678,264 B1 * | 1/2004 | Gibson | ........................ | 370/352 |
| 6,721,269 B1 * | 4/2004 | Cao et al. | .................... | 370/227 |
| 6,731,639 B1 * | 5/2004 | Ors et al. | .............. | 370/395.51 |
| 6,778,496 B1 * | 8/2004 | Meempat et al. | ........... | 370/230 |
| 2003/0088699 A1 * | 5/2003 | Luciani et al. | .............. | 709/243 |

OTHER PUBLICATIONS

Le Faucheur F: IETF Multiprotocol Label Switching (MPLS) Architecture IEEE International Conferenc On ATM. Jun. 22, 1998—XP002115225.
Rosen E et al: "BGP/MPLS Virtual Private Networks" IETF Request for Comments Mar. 1, 1999—XP002163535.
Viswanathan A et al: "Evolution of Multiprotocol Label Switching" IEEE Communcaitons Magazine, IEEE Service Center, Piscataway, J.J, US May 1, 1998—XP000752861.

* cited by examiner

*Primary Examiner*—Brian Nguyen
(74) *Attorney, Agent, or Firm*—Barnes & ThornburgLLP

(57) ABSTRACT

A label switched path is determined in a communications multi-service network comprising a plurality of nodes interconnected via quality of service capable tunnels to provide a QoS guarantee for a session in which resource availability from the network edge to multiple central stages and resource availability from the multiple central stages to the destination edge are established. A series of quality of service capable tunnels is selected by offering a plurality of candidate central stages to the destination edge and allowing the destination edge to select a complete path across the network. A label stack comprising a set of four labels is attached to a payload to define a selected sequence of tunnels.

62 Claims, 10 Drawing Sheets

COMMUNICATIONS NETWORK

FIELD OF THE INVENTION

This invention relates to arrangements and methods for the switching or routing of traffic in a communication network.

BACKGROUND OF THE INVENTION

Traditionally, two types of legacy telecommunication networks have been developed. The first type of legacy network is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. Such packet traffic includes for example Internet protocol (IP) traffic. There is currently a drive towards unified networks which provide end to end transport for both voice and data services, and to this end the use of asynchronous transport has been introduced. This of course introduces the problem of supporting different protocols over a common network.

Asynchronous Transfer Mode (ATM) is the technology specified by the ITU-T as a broadband network technology suitable for all applications. For Internet protocol traffic however, ATM has proven to be less than fully effective at supporting Layer 3 routed applications, such as routed virtual private networks. This has led the IRTF (Internet Research Task Force) to specify multi-protocol label switching (MPLS) as a technology which inherits the desirable characteristics of ATM but is better matched to the Internet protocol. In particular MPLS provides a frame merge function in which data frames received from multiple sources are captured and sent out with a common label. This is required for the support of Internet Protocol Layer 3 Routed services. Service providers would ideally prefer a single network technology to support all of the services that they provide as this would achieve the lowest possible operational cost.

A particular problem with the introduction of a multi-service network is that of accommodating the various transport protocols and, in particular, that of providing end to end quality of service guarantees for high priority traffic such as voice. In particular, there is a need to provide a network that can carry both data and voice traffic at a local, national and international level while utilising a common transport protocol. A further problem with such a network is that of real time management of the virtual public/private networks that are established within the network. At present, each VPN manager requires a detailed knowledge of the network topology. In a large network this is a very significant operational task.

SUMMARY OF THE INVENTION

An object of the invention is to minimise or to overcome the above disadvantages.

According to a first aspect of the invention, there is provided a method of routing an information packet over a label switched path between first and second end stations in a virtual public/private network defined over a network comprising a hierarchical arrangement of first, second and third levels of routers, the method comprising attaching to the information packet a sequence of labels indicative of a corresponding concatenated sequence of label switched path sections within the virtual public/private network, each said path section extending between a pair of said routers.

According to a further aspect of the invention, there is provided a communications network comprising a hierarchical arrangement of first, second and third levels of routers and over which one or more virtual public/private networks is defined, the network having a management system for routing packet traffic over a said virtual public/private network by attaching to each packet a sequence of labels indicative of a corresponding concatenated sequence of label switched path sections within the virtual public/private network, each said path section extending between a pair of said routers.

In our co-pending application Ser. No. 09/190,081, the use of a, the use of a two-layer MPLS network in order to simplify the management of Virtual Public/Private Networks (VPN) is described. In the present application, the use of a four-label stack provides connection oriented behaviour for voice traffic whilst retaining strict edge control analogous to standard IP network operation. The use of a three layer, five stage hierarchical network of routers enables the technique to be employed over an international or global network.

In a preferred embodiment, a four-label stack at the edge of the network is utilised to achieve end-to-end connection oriented behaviour with guaranteed Quality of Service (QoS) whilst requiring no further control actions on the network. The four-label stack provides sufficient control to establish a required connection end to end across the network.

Advantageously, a virtual private/public network is defined with multiple stages of constraint-based routed label switched paths.

Multi-protocol label switching (MPLS) is the preferred network muting protocol employed herein. MPLS has been defined by the IETF so as to be substantially independent of the underlying transport mechanism. Mappings on to ATM have been defined as well as frame-mode networks using HDLC (High-level data link control) based or other forms of frame transport.

MPLS includes the concept of stacked labels. We have found that this concept allows the network arrangements described herein to operate at multiple layers. For instance a first label in the stack can relate to a traffic trunk. A switch which only swapped this first label would handle the traffic trunk transparently. A switch which popped the first label, swapped the second label and pushed a new first label would be switching a service instance between two traffic trunks. In a particularly advantageous embodiment, a four label stack is used to establish a connection across a five-stage network in which the only per-connection control action is to assert the four-label stack at the first node of the five-stage network.

In a further aspect, the invention provides a method of selecting a series of tunnels to provide a QoS guarantee for the session in which resource availability from the edge to multiple central stages is known as well as resource availability from the multiple central stages to the destination edge. The selection is made by offering a number of candidate central stages to the destination edge and allowing the destination edge to select the complete path.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the accompanying drawings in which:—

DESCRIPTION OF PREFERRED EMBODIMENTS

Figure 1:
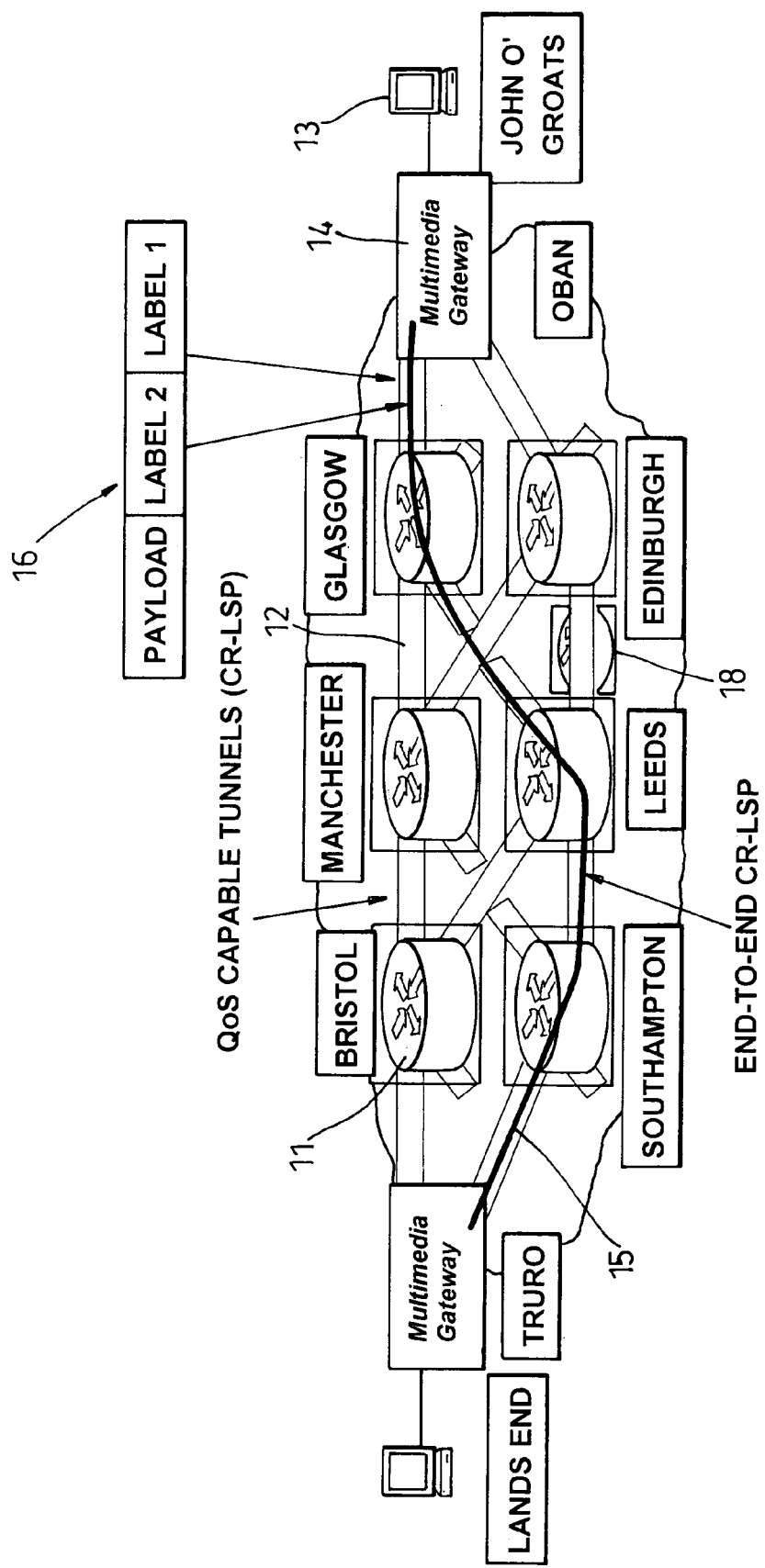
FIG. 1 is a schematic diagram of an exemplary virtual public/private network.

Referring first to FIG. 1, which is introduced for explanatory and comparative purposes, this figure illustrates in highly schematic form an exemplary virtual public/private network (VPN) deployed nationally or regionally in order to provide session switched multimedia services on a territorial basis. The network comprises a number of service nodes 11, located at the main centres of population, inter-linked via a network of core nodes by quality-of-service (QoS) capable tunnels 12. The construction of the core network will be described below. In FIG. 1, only one core node 18 is shown in the interests of clarity, but it will of course be appreciated that the network will incorporate a plurality of core nodes. Access to the network from user terminals 13 is provided via media gateways 14 each serving to one or more service nodes. Traffic is transported on constraint-based routed label switched paths (CR-LSP) 15 established between respective gateways. The network carries packet traffic, each packet 16 comprising a payload and first and second labels (Label1, Label2) indicative of the path over which the packet is to be routed.

CR-LSPs (constraint-based routed label switched paths) are deployed between the service nodes 11 of the network. Services such as inter-active voice, requiring strict QoS guarantees are supported by end-to-end CR-LSPs 15 as illustrated in FIG. 1. To take a simple example of QoS support, if all of the CR-LSPs at both traffic-trunk level and end-to-end are constant bit rate, then the performance of the end-to-end CR-LSP can be substantially equivalent to ATM-AAL1 (Asynchronous Transfer Mode Adaptation Layer One) assuming a typical 48-byte packetisation.

The IETF has defined two protocols for the establishment of CR-LSPs. These protocols are RSVP-Traffic Engineering, and Constraint-routed Label Distribution Protocol. CR-LSPs (constraint-based routed label switched paths) are point-to-point paths between designated network nodes. Such paths are each assigned a traffic contract which, in suitable carrier strength implementations, will be policed for conformance. The following description of the best method of performing the invention is based on the CR-LDP protocol, but it will be appreciated by those skilled in the art that the RSVP-TE protocol has equivalent functionality and can be used to serve the same purpose. Such a CR-LSP (constraint-based routed label switched path) has an LSPID (label switched path identifier) which can be used to specify a hop in a CR-LDP request. In such a case the new CR-LSP will be multiplexed into the specified CR-LSP and allocated a second level label. It is therefore possible to specify within the network of FIG. 1 a virtual public/private network (VPN) with multiple stages of first level CR-LSPs and to provide end-to-end services having a CR-LSP traffic contract.

A feature of the constraint based routed label distribution protocol (CR-LDP) employed in the network of FIG. 1 is the use of an "abstract node" to define routing constraints. An abstract node consists of a sub-network of real nodes (core nodes) over which the constraint based muted label distribution protocol is allowed to select any available path to achieve a requested connection. Thus in a path specified as (real node A—abstract node B—abstract node C—real-node D) there may be multiple real nodes in each of the abstract nodes, and there may also be multiple trunks between the abstract nodes. This concept of abstract nodes simplifies the management of a VPN as the network manager only requires a view of the network at the abstract node level and does not require detailed view of the construction or internal operation of an abstract node.

Figure 2:
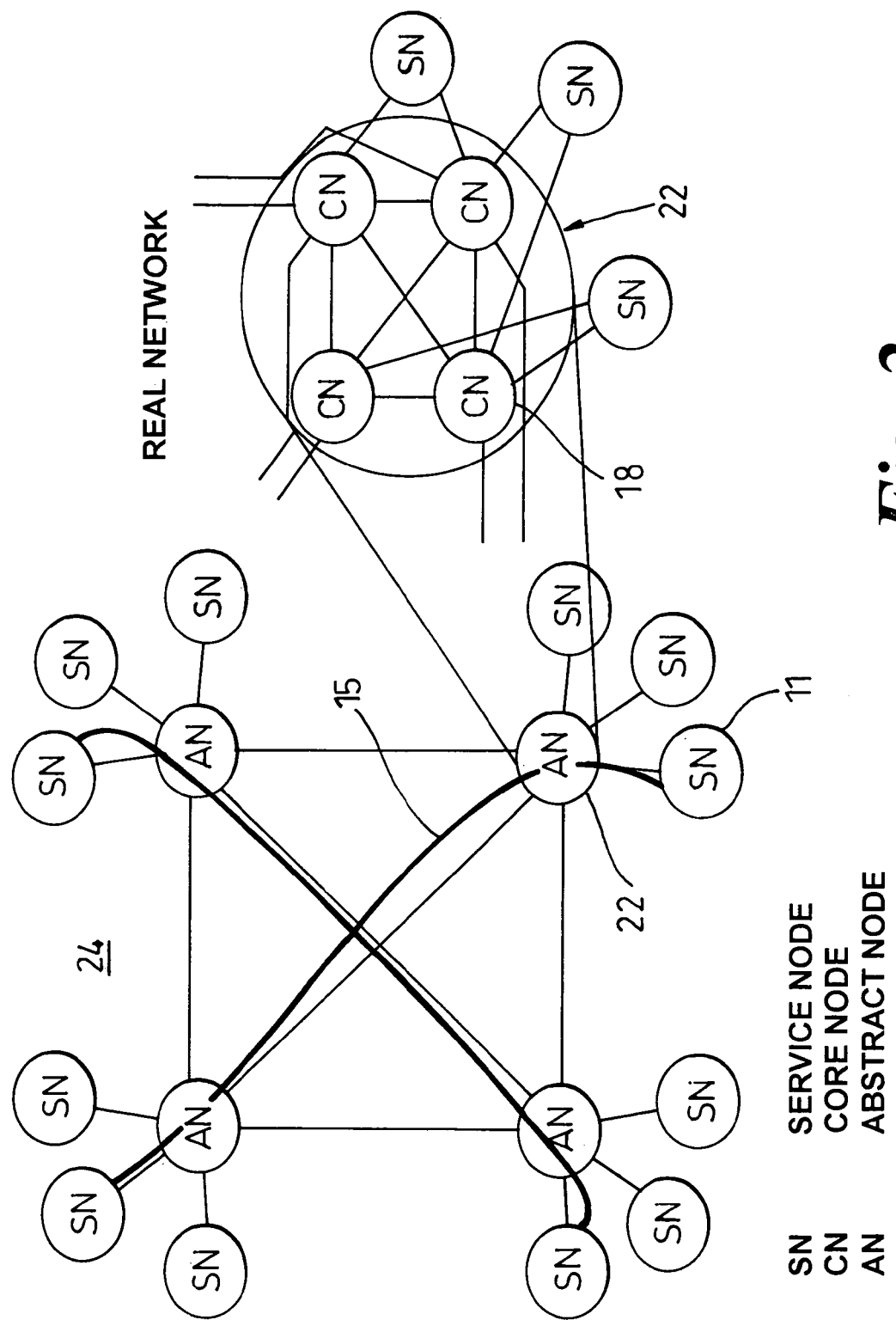
FIG. 2 shows the construction of an abstract node employed in the network of FIG. 1 and illustrates the network construction in further detail.

Referring now to FIG. 2, which is also introduced for explanatory and comparative purposes, this depicts in schematic form a portion of the network of FIG. 1. FIG. 2 is a representation of a simple network in its abstract node form, together with a possible real network realisation of one of the abstract nodes.

The network represents groups of multiple service nodes (SN) 11 each arranged around a respective abstract node (AN) 22 in each of four locations. One of the abstract nodes 22 is shown in detail to illustrate its construction from a sub-network of four core nodes (CN) 18 with multiple transport links 23 therebetween. In the network of FIGS. 1 and 2, an abstract node is defined by an IP address prefix, and all core nodes which include that prefix in their IP address are treated as part of that abstract node. It will of course be understood that an abstract node may be constructed from some other number of core nodes. Further, abstract nodes can have a temporary, semi-permanent or permanent existence depending on the network requirements.

Constraint based routed label switched paths 15 are deployed between service nodes 11 via the appropriate intervening abstract nodes 22.

In the arrangement of FIGS. 1 and 2, it is relatively simple for a management system controlling the real network to produce an abstract node version of its information model for use on a super-ordinate network manager. It is also relatively easy to produce a graphical representation of such a network and to specify traffic trunks by defining paths between service nodes and passing through abstract nodes. These graphical paths can then be used to automatically construct CR-LDP requests to establish the traffic trunks. CR-LDP can run on an existing constraint-based routed label switched path (CR-LSP) to renegotiate the traffic contract so that the technique provides for near real-time creation of VPNs as well as flexible service level agreements which can be modified e.g. on a diurnal basis or on any basis which suits the customer traffic profile.

Figure 3:
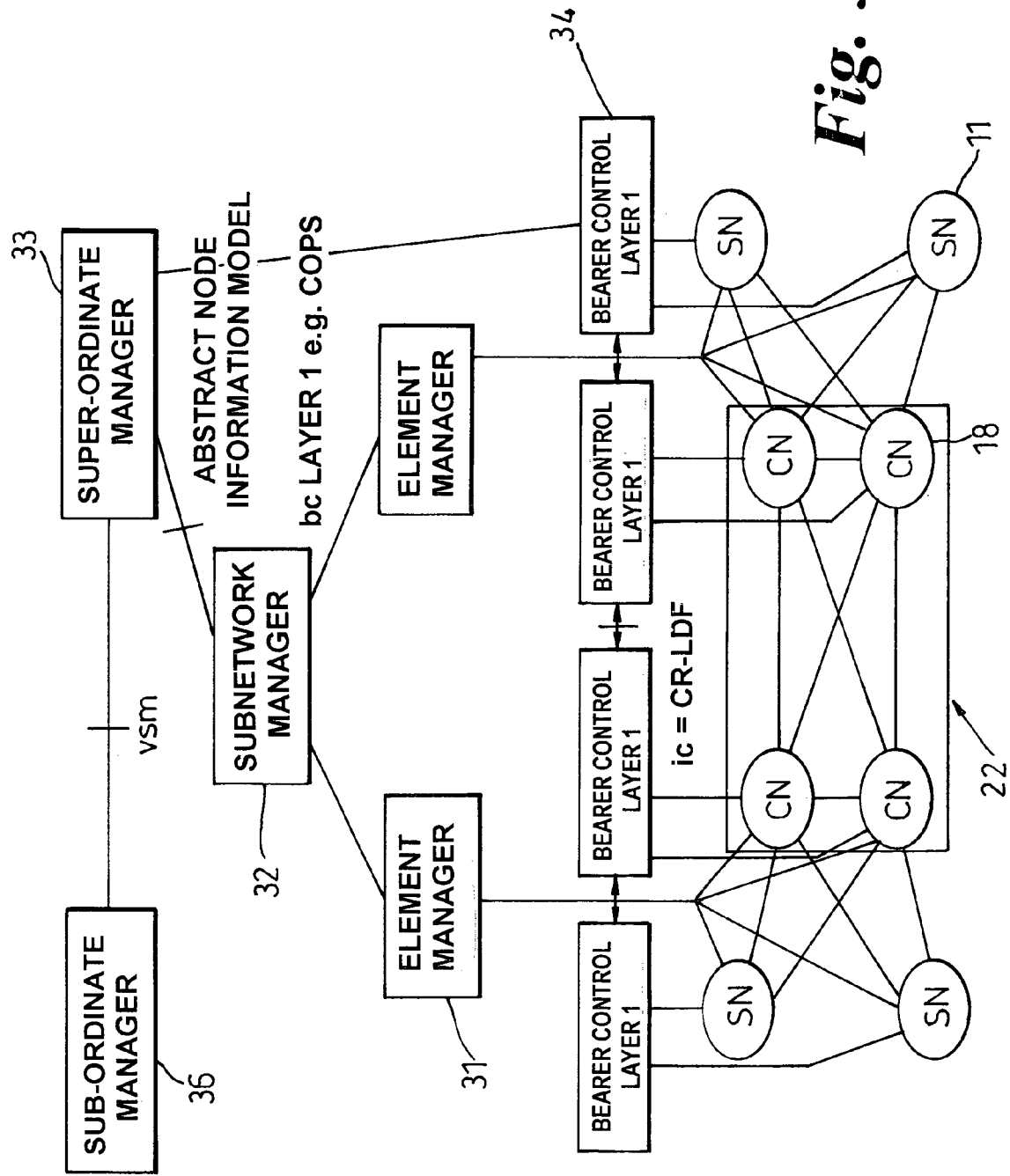
FIG. 3 shows an exemplary Layer 1 management and bearer control architecture.

A management and bearer control function for the Layer 1 physical network of FIGS. 1 and 2 is illustrated in FIG. 3. This figure shows by way of example a simple network based on a group of core nodes 18, constituting an abstract node 22, and service nodes 11. The real network has a management system based on a hierarchical structure of element managers 31 and (sub) network managers 32. The (sub) network manager 32 is responsible for constructing the abstract node information model representation of the network, which information is passed to a super-ordinate manager 33. A subordinate manager 38 provides virtual switch management to perform fault, configuration, accounting, performance, and security management. The super-ordinate manager 33 is used for defining VPNs and placing traffic trunks to realise those VPNs. The super-ordinate manager also creates, modifies and deletes virtual switches. Traffic trunk requests are passed to bearer control Layer 1 (34) to initiate the CR-LDP process. This is the interface point for MPLS Layer 1 Bearer Control for which the common open policy service protocol (COPS) is preferred.

Figure 4:
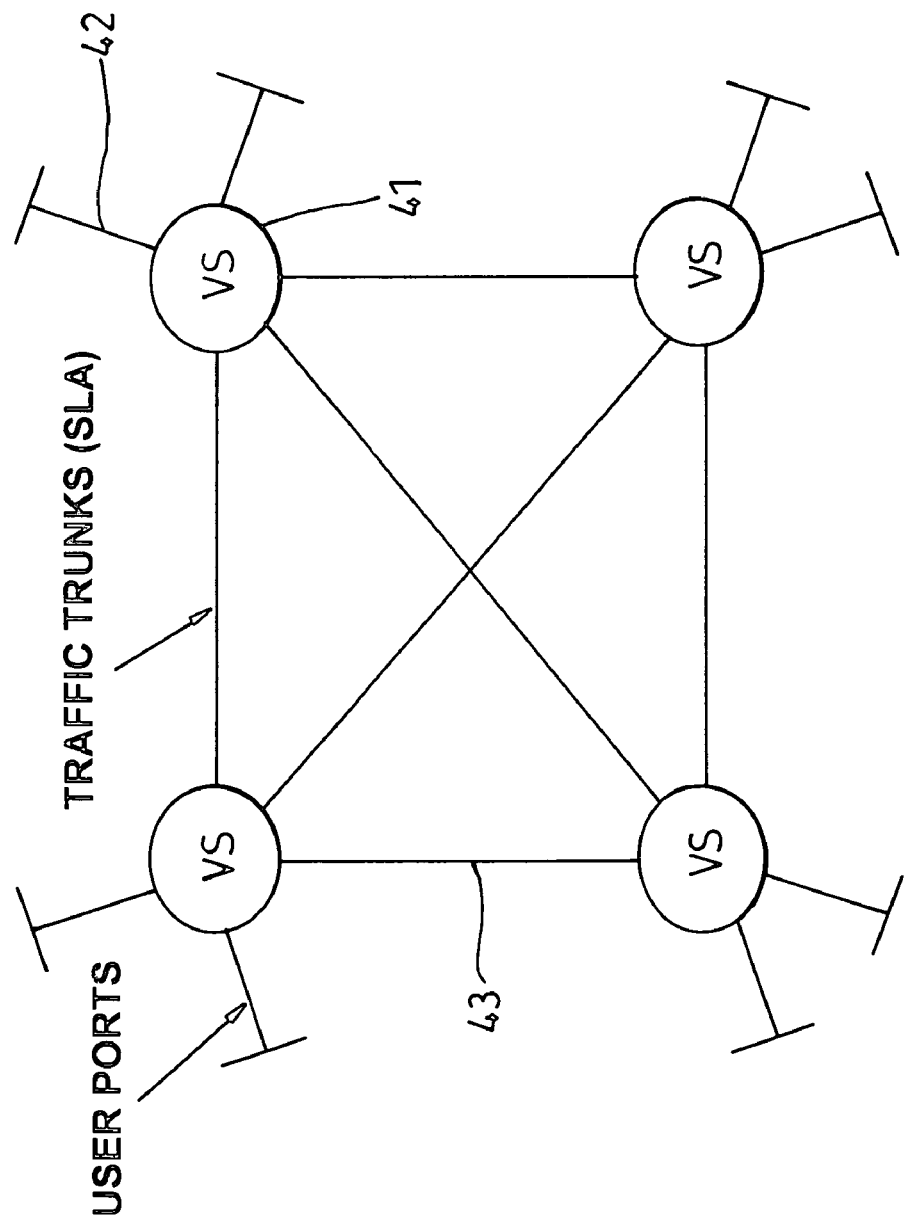
FIG. 4 illustrates a virtual public/private network information model.

The information model illustrated in FIG. 4 for the sub-network manager 32 is also simplified in that only the Layer 2 virtual switches (VS) 41 are visible. These virtual switches are configured with access ports 42 to which users are connected and traffic trunks 43 configured end-to-end and provisioned with SLAs.

Figure 5:
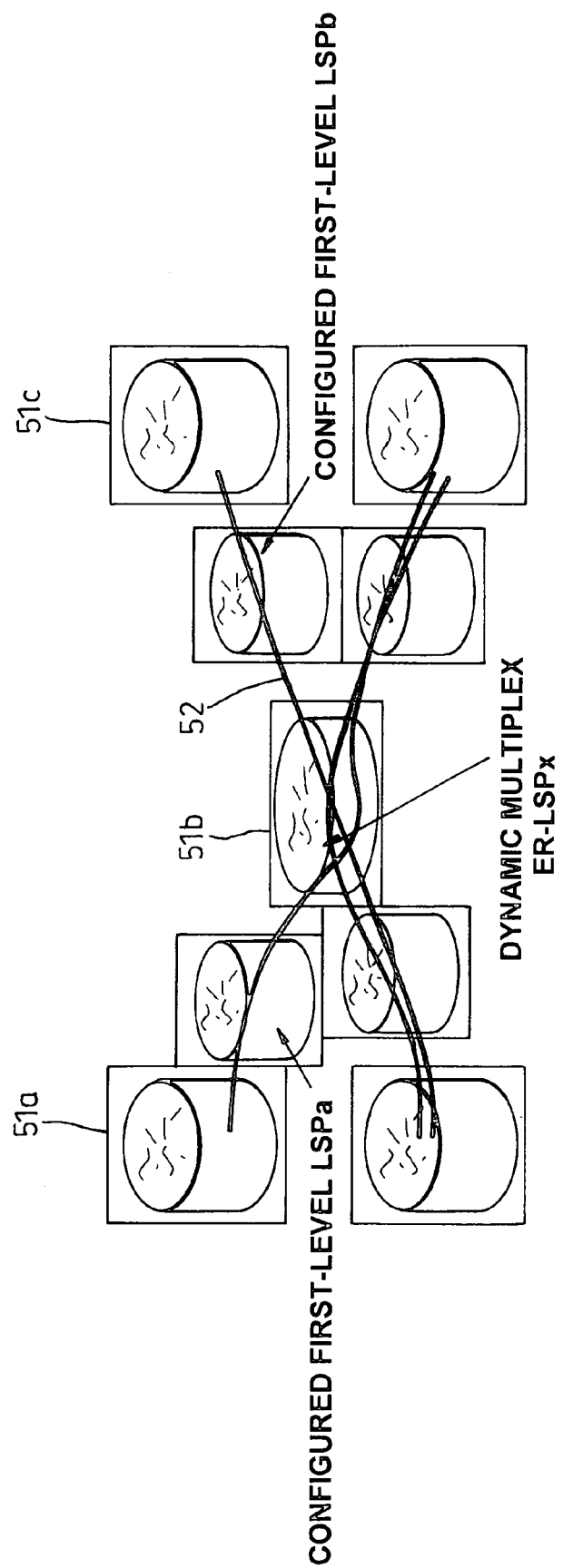
FIG. 5 illustrates the concept of a Dynamic Multiplex Label Switched Path.

In FIG. 5 the concept of a dynamic multiplex label switched path (DM-LSP) according to a preferred embodiment of the invention is illustrated. In the exemplary network of FIG. 5, a hierarchical three layer arrangement of local nodes 51a, regional nodes 51b and international nodes 51c is provided, each node comprising a label switched router. Within the three layer network of MPLS label switched routers (LSR) 51a, 51b, 51c, a mesh of Layer 1 label switched paths (LSPs) 52 is established. As described above it is possible to define the constraints for a new label switched path (LSP) in terms of existing LSPs, in which case a Layer 2 LSP is established and a second level label defines the embedded CR-LSP. In the dynamic multiplex-LSP arrangement of FIG. 5, a third level label is defined which relates to one of a number of sessions which can be dynamically multiplexed onto the same label switched path (LSP). In our arrangement depicted schematically in FIG. 5, a new session may be multiplexed onto the dynamic multiplex-LSP if and only if the resource constraints of the ingress and egress Layer 1 CR-LSPs are satisfied. The checking of these constraints can be performed in the first and third stage LSRs (label switched routers) 51a, 51c, which have full visibility of the resources committed to the ingress and egress Layer 1 LSPs respectively. The Layer 2 LSRs 51b perform an implicit switching function in that sessions may be dynamically routed between first and third stage LSRs 51a, 51c, using any available Layer1 CR-LSP, but the second stage LSRs 51b are not involved in the control process. FIG. 5 also illustrates a number of LSRs which are used to route the Layer 1 CR-LSPS. These are additional network stages that may be required for the traffic management of large numbers of VPNs, but they need not be directly involved in the operation of the DM-LSPs.

Figure 6:
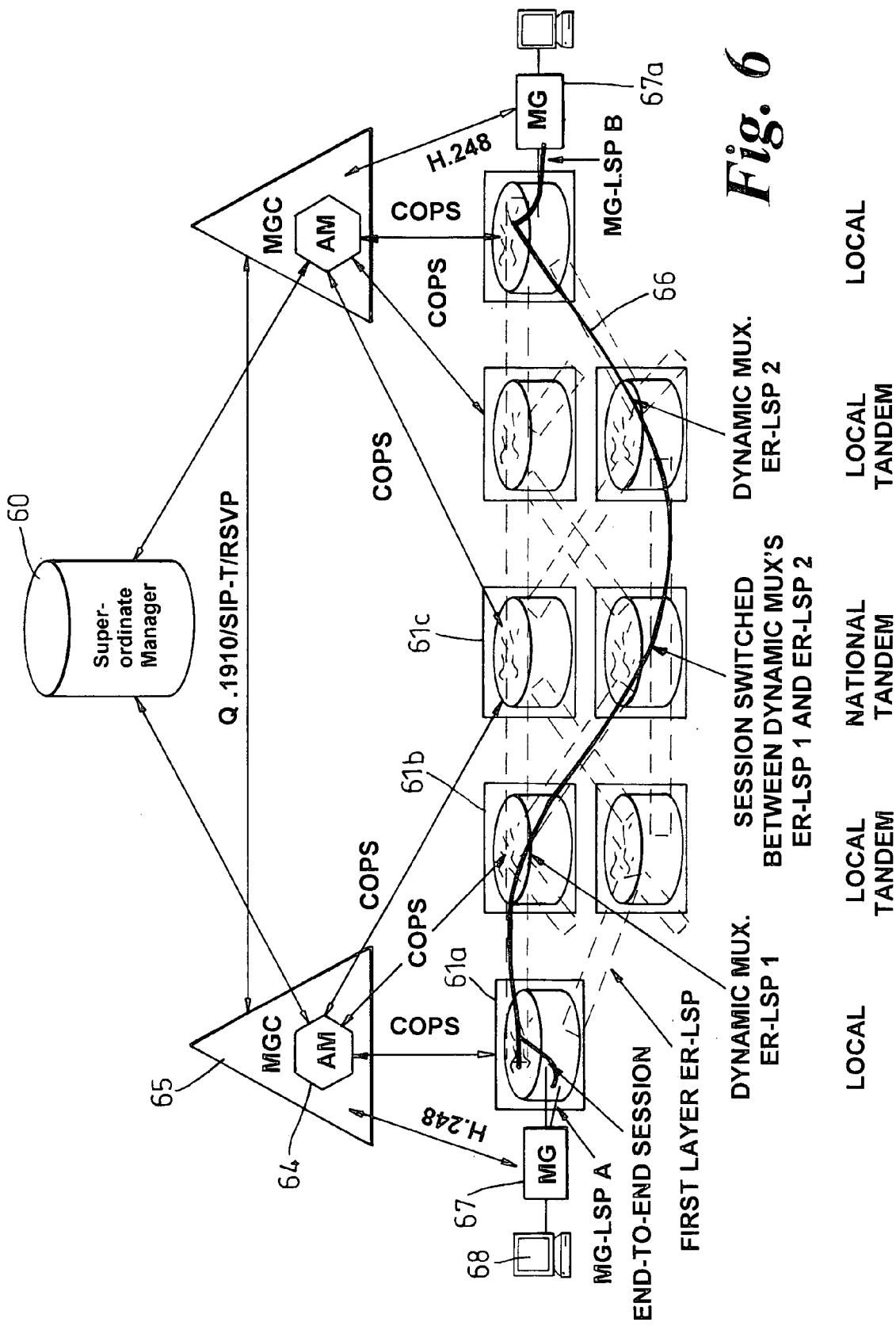
FIG. 6 illustrates a virtual public/private network structure according to a preferred embodiment of the invention.

An exemplary five-stage virtual private network (VPN) with four-layer label control is illustrated in FIG. 6. The network comprises a hierarchical or layered structure of local tandem routers 61a, national tandem routers 61b and tandem routers 61c. A super-ordinate manager 60 is responsible for configuring one or more virtual private networks within the network structure of FIG. 6. This VPN configuration is performed by defining the Layer 1 LSPs (label switched paths) in terms of service level agreements and constraints for their routing through the network. This information is formulated as a COPS (Common Open Policy Service) command which is pushed down to the label switch router (LSR) 61a which forms the ingress of the requested CR-LSP. The super-ordinate manager 60 also pushes the COPS commands to an admission manager (AM) 64 within media gateway controller 65, which admission manager records resources available for use in service requests, the admission manager 64 then pushes the COPS messages down to the label switched routers (LSRs) 61a, 61b, 61c, where they are used to invoke RSVP-TE or CR-LDP sessions in order to establish the virtual private network (VPN). The super-ordinate manager 60 then establishes a mesh of DM-LSPs (dynamic multiplex label switched paths) 66 between all of the local label switch routers 61b and all of the national tandem label switch routers 61c. This mesh establishes a network in which a constraint-based routed label switched path (CR-LSP) between any two local label switch routers can be specified by a pair of DM-LSPs (dynamic multiplex label switched paths). For a full mesh configuration, there are as many alternative routes between each pair of local label switch routers as there are national tandem label switch routers deployed in the network. After the super-ordinate manager 60 has configured the core network, the admission manager 64 configures a set of label switched paths between the media gateway 67 coupled to user terminal 68 and the local LSR node 61a. When a media gateway controller 65 wishes to establish a session with QoS guarantees it requests its associated admission manager 64. A session request may be initiated directly by a session control protocol such as Q1901 or SIP, or it may be initiated as a result of intercepting an RSVP message. Communication between the media gateway controllers advantageously uses a protocol which is able to tunnel connection control information such as Q1901, SIP or RSVP. The connection control information which is tunnelled between media gateway controllers is a list of label switched path identifiers (LSP-Ids). In the forward direction this information comprises a list of candidate dynamic multiplex label switched paths (DM-LSPs) which are suitable to access a national tandem together with an LSP-ID (label switched path identifier) for the media gateway (MG) to local LSR connection. In the reverse direction the control information comprises a list of the four LSP-IDs selected to form the end-to-end connection. I.e. MG-Local LSR, Local LSR-National Tandem LSR, National Tandem LSR-Local LSR, Local LSR-MG. The scheme may be operated separately for each direction of transport or bi-directional operation could be chosen. The five-stage network of FIG. 6 accommodates long distance or global traffic; fewer stages would be required for local services. On receipt of the list of the four LSP-IDs defining an end-to-end connection, the admission manager 64 uses COPS to push the list down to the local node 61a for routing to the far-end media gateway 67a. The Local LSR response is to push four labels on to all packets received from the label switched path (LSP) identified as the connection from the local media gateway and then to forward the labelled packets. The media gateway may use labels internally, in which case the payload from the perspective of the Local LSR 61a will contain labels of significance only to the two media gateways involved. The first two labels are the two associated with the dynamic multiplex-LSP to the national tandem router 61b, which labels were allocated when the virtual private network was configured, and are stored in the local LSR 51a as related to its LSP-ID. The next two labels receive special treatment. An LSP-ID is intended for use as a network wide significant identifier for use in management systems as well as in LSRs. This LSP-ID comprises the IP Address of the ingress node of the CR-LSP as well as a sixteen bit locally significant identifier within that node. This locally significant identifier is sufficient to identify the DM-LSP from the National Tandem LSR 61b to the destination Local LSR 61a and from the Local LSR to the media gateway. These LSP-ID local identifiers are therefore used as the third and fourth labels and are treated as indirect addresses at the national tandem and local LSRs respectively.

We have found that a network having three hierarchical levels of routers is effective in providing international or global coverage, and that a virtual private network may be defined therein as a sequence of quality of service (QoS) tunnels each established between routers of adjacent hierarchical levels. In such a virtual private network, a stack of four labels will always be sufficient for the identification of a end to end path across the network.

The process of the COPS (Common Open Policy Service) protocol referred to above allows the policy being applied to a particular controlled flow on an MPLS router to be asynchronously updated. That is, the MPLS router is told how to change the treatment it applies to the flow, without first asking to change it. This process is underpinned by the use of ClientHandles to identify the flow. When the path for a new flow is received at an admission manager, a COPS Decision (DEC) message is pushed, that uses the ClientHandle associated with the outermost LSP. This performs the selection of the first layer ER-LSP. Contained with in this DEC message is the list of paths over which the flow is to be routed. This list will include the LSP-ID of the near-end dynamic multiplex, the LSP-ID of the far-end dynamic multiplex and the LSP-ID of the connection from the far-end local switch to the destination media gateway.

Figure 7:
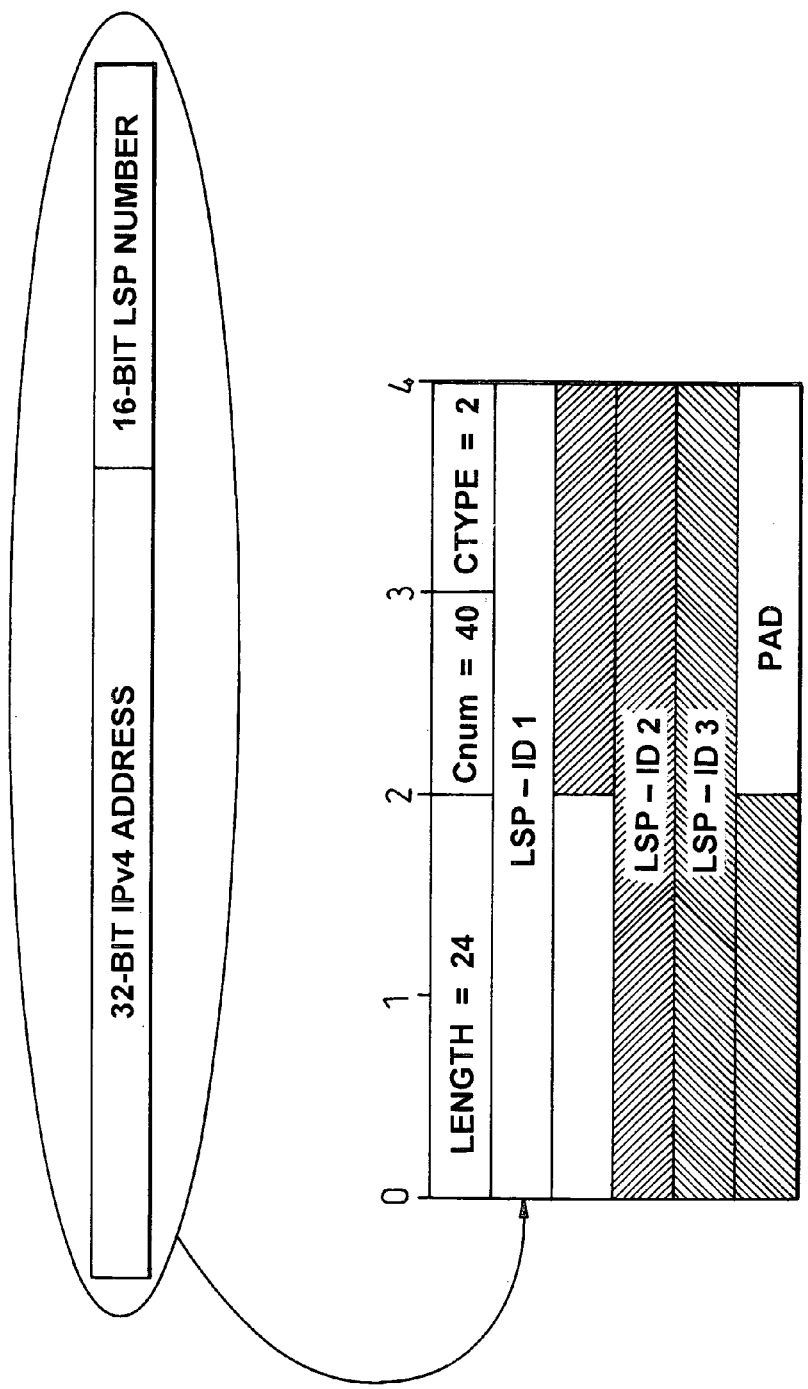
FIG. 7 illustrates the use of a COPS mechanism in the network of FIG. 6.

To facilitate the transfer of this information, a preferred embodiment of the invention defines a new COPS Specific Object. This object is shown schematically in FIG. 7. The object uses the existing COPS Specific Object pattern and has a CNum of 40 and CType of 2. The CNum is the identifier for the object, and the CType is the instance of the object. The object contains the list of LSP-IDs for the flow in the order in which they are to be used. Therefore LSP-ID 1 indicates the near-end dynamic multiplex and will be translated at the Local LSR into a two-tier label stack. Note that although the Clienthandle identifies the layer 1 trunk, this trunk and the dynamic multiplex share the same LSP-ID space at the local router and therefore LSP-ID 1 can easily identify the correct label stack LSP-ID 2 will contain the LSP-ID of the second dynamic multiplex and LSP-ID 3 will contain the LSP-ID of the last hop from the far-end Local LSR to the media gateway. These next two values are the full forty eight-bit LSP-IDs. In order that these two values should be copied in the same order into each packet in this flow as defined above, they must undergo suitable translation. As is illustrated in FIG. 7, each LSP-ID consists of a thirty two-bit IP address and a sixteen-bit LSP number. It is the sixteen bit LSP number that is of interest so each LSP-ID must have the IP address removed and replaced with four leading zeros. This makes use of the fact that inserting leading zeros on a binary number leaves the value of that number the same i.e. 1101=0000 1101.

With this translation performed, the LSP-IDs should be inserted in the same order as they occur in the COPS message, into the header of each packet in this flow at the Local LSR. That is, LSP-ID 3 should be the innermost of the labels. Once this is successfully completed, a Report State (RPT) message is sent back, indicating that the new session has been successfully installed.

By analogy with the PSTN, five stages of switching are considered desirable for QoS capable networks leading to Local/Local-Tandem/National-Tandem/Local-Tandem/Local routing for national services and Local/Local-Tandem/International-Tandem/Local-Tandem/Local routing for International services.

Figure 8:
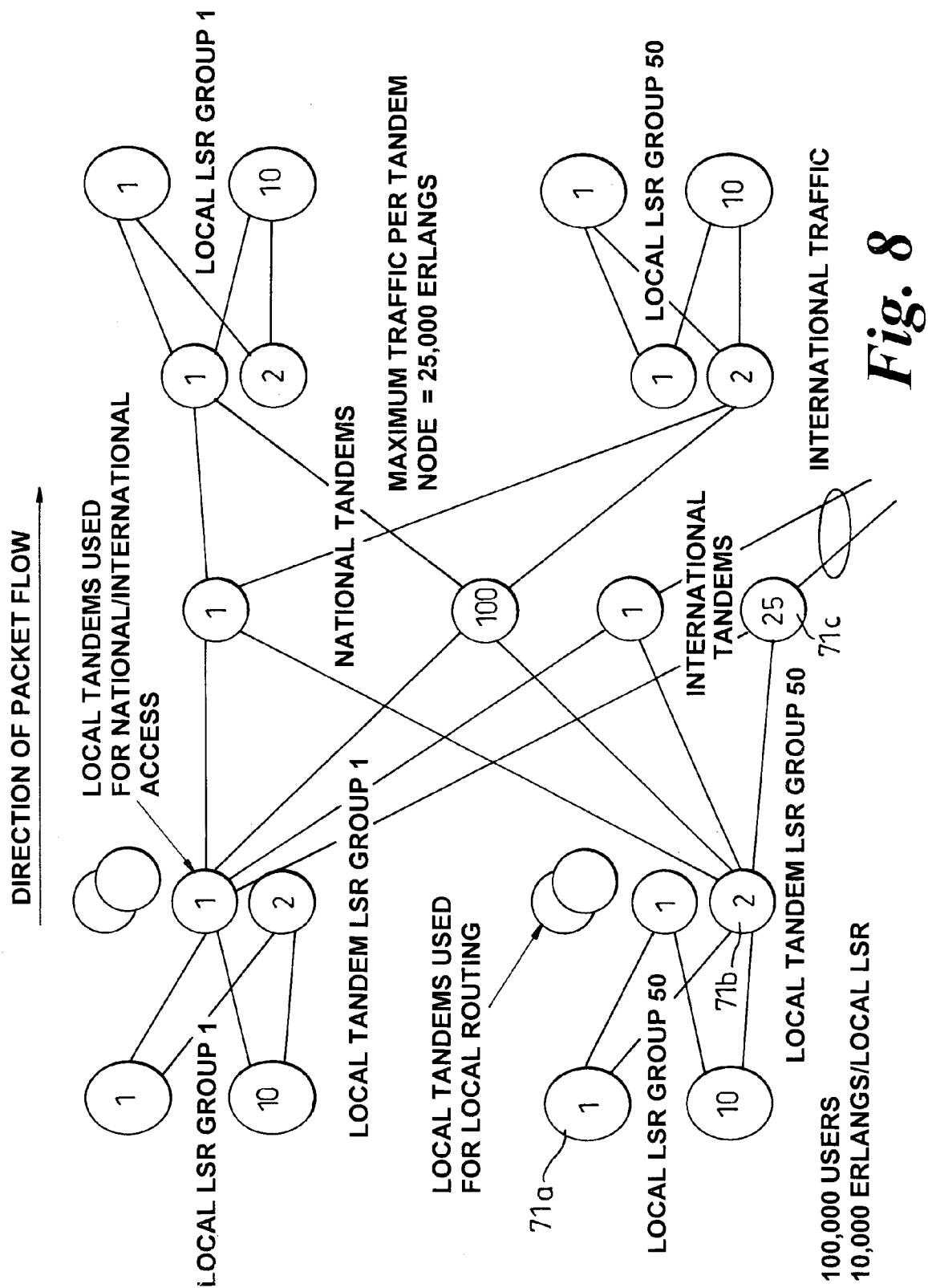
FIG. 8 illustrates a schematic representation of the network of FIG. 6 demonstrating its scalability.

By way of example of the efficacy of the techniques described above, consider a carrier having 50 million customers in the USA and a further 50 million customers in the rest of the world with 0.1 Erlang of session traffic per customer. Assume that typically 40% of traffic is long distance and 10% of traffic is International. The United States network could be organised with e.g. five hundred local nodes with typically 100,000 customers each. The Local-Tandems could be disposed in e.g. fifty groups with two switches in each group dedicated to National and International traffic. Approximately one hundred nationaltandems and twenty five international-tandems would be deployed throughout the world to provide a global network. In this scheme the local nodes would typically support only 10,000 Erlangs and no tandem node would need to support more than 25,000 Erlang of session traffic. These are trivial amounts of traffic by modern standards and this readily demonstrates the flexibility and efficacy of the five-stage network described herein. The connectivity of such a network is illustrated schematically in FIG. 8. The nodes 71a, 71b, 71c as illustrated in FIG. 8 are typically virtual nodes, and it will be appreciated that a real physical switch could support a number of such virtual nodes.

Figure 9:
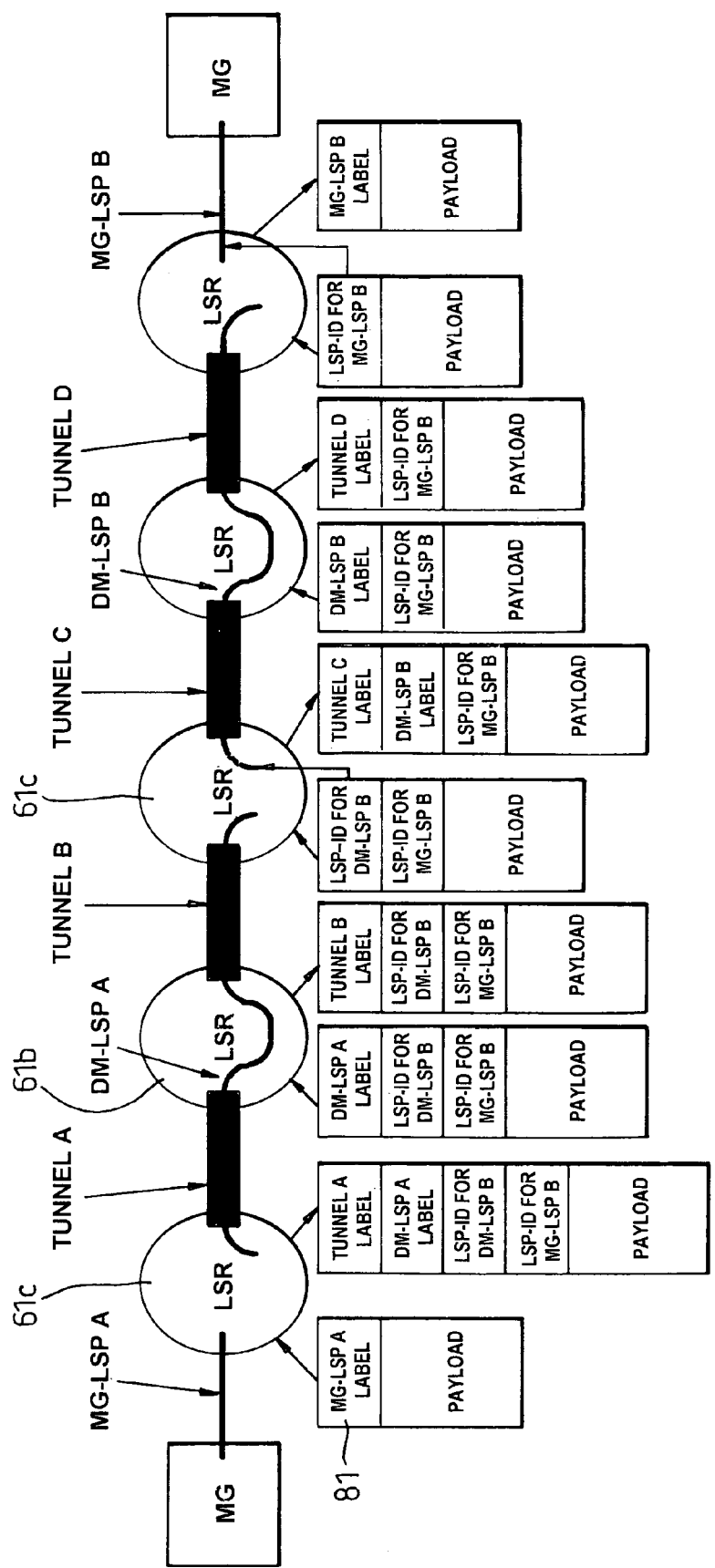
FIG. 9 illustrates the label processing functions at each node of the network of FIG. 6.

The label processing in each of the five nodes is illustrated schematically in FIG. 9. As shown in this figure, the Local LSR 61a receives a packet with the label 81 assigned to the MG-LSP A at configuration time. The payload is retrieved and four labels are pushed: These four labels comprise the information, Tunnel A Label/DM-LSP A Label/LSP-ID of DM-LSP B/LSP-ID of MG-LSP B. Assuming penultimate hop popping, then the packet received by the local tandem node 61b is headed by the DM-LSP A Label. As this is the penultimate node for the DM-LSP A, its label is popped. The payload and remaining labels are then sent out on Tunnel B with Tunnel B Label. Again with penultimate hop popping the packet received by the national tandem 61c is headed by the LSP-ID of DM-LSP B this label is consumed to identify DM-LSP B and the label pair Tunnel C Label/DM-LSP B Label are pushed. At the distant local tandem, the DM-LSP B Label is recognised as a penultimate hop for DM-LSP B and is thus popped. The payload and remaining labels are sent out on Tunnel D with Tunnel D Label. At the destination local LSR 61a, the packet is headed by the LSP-ID of MG-LSP B, this is consumed in identifying MG-LSP B and the packet is delivered to the media gateway with MG-LSP B Label which was established when MG-LSP B was configured.

Figure 10:
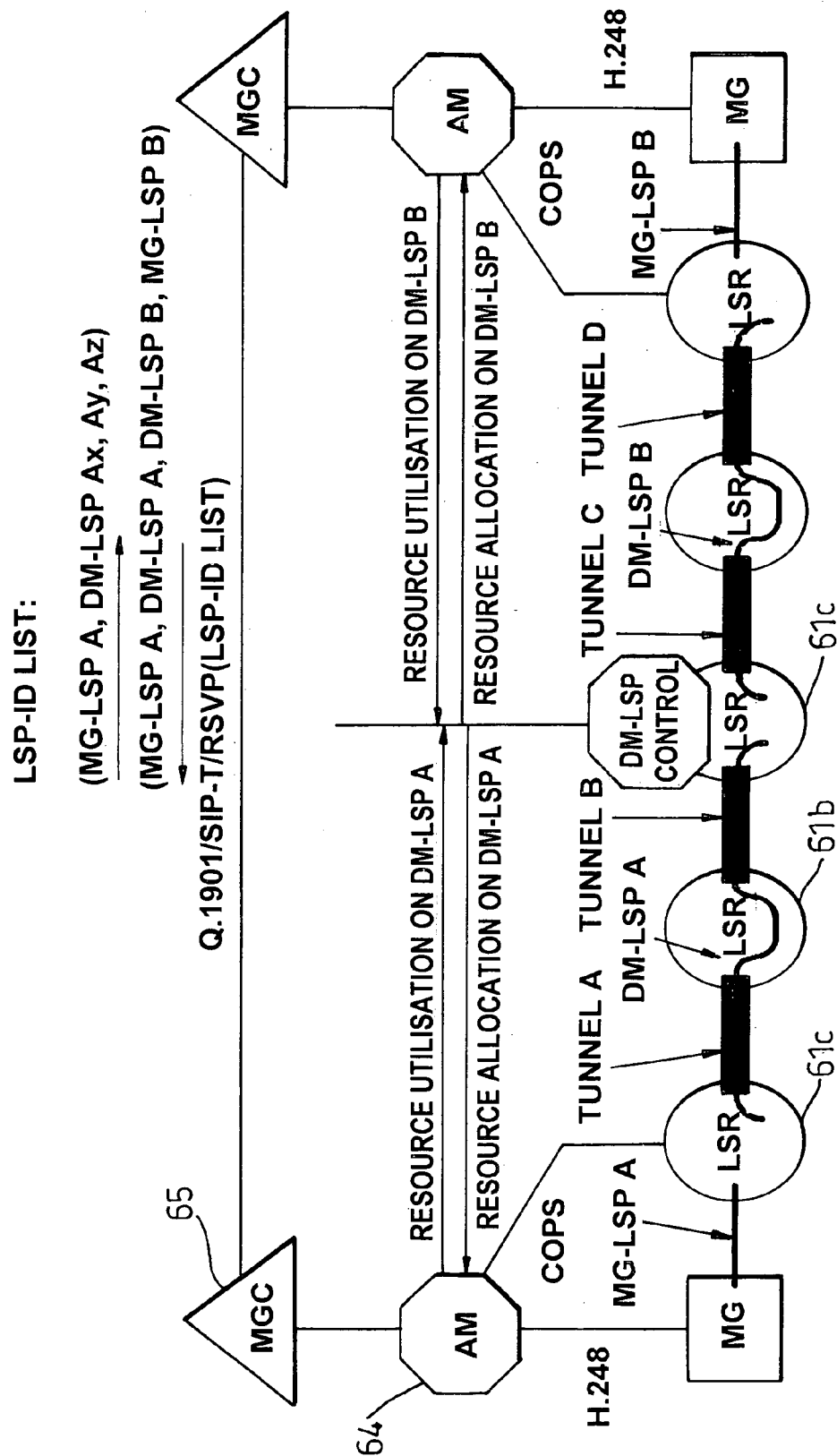
FIG. 10 illustrates the use of control functions of the network of FIG. 6 to guarantee connection oriented behaviours of the end-to-end path.

The overall control environment for five-stage MPLS networks is illustrated in FIG. 10. Each admission manager 64 associated with a media gateway controller 65 maintains a regular dialogue with the dynamic multiplex-LSP control functions in the national and international tandems. On a routine basis, the admission manager informs the DM-LSP control of its current utilisation of resources on a particular dynamic multiplex-LSP. This allows the dynamic multiplex-LSP control to evaluate the resource utilisation on the hidden tunnel (i.e. egress from local LSR to national tandem or ingress from national tandem to local) for this dynamic multiplex-LSP and to offer an explicit allocation of resources to the admission manager for the next control interval. Assuming typical session holding times equivalent to current PSTN practice of about 120 seconds, then control intervals of 10 or 20 seconds would be appropriate. When a session request arises, the admission manager on the originating side is able to select an MG-LSP A and to nominate candidate dynamic multiplex-LSPs Ax, Ay, Az which have sufficient allocated resource for the session. The terminating side admission manager is now able to define the LSP-ID tuple for the connection by inspecting candidate dynamic multiplex-LSPs Bx, By, Bz. After selection, the admission manager offers MG-LSP A/DM-LSP A/DM-LSP B/MG-LSP B, this is then used by the admission manager to push the end-to-end connection. If the DM-LSP control function is cautious in allocating resources to admission managers, then the whole process is deterministic and the Layer 1 tunnels are never overloaded. Thus, with wirespeed operation of all LSRs and CBR contracts for the Layer 1 tunnels, end-to-end MPLS services behave as a substantially exact equivalent to end-to-end ATM CBR traffic. This assumes that all physical ports between nodes are at OC12/STM4 or higher speeds and that the normal packet size of IP of 1500 bytes is not exceeded.

It will be understood that the above description of a preferred embodiment is given by way of example only and that various modifications may be made by those skilled in the art without departing from the spirit and scope of the invention.

The invention claimed is:

1. A method of routing an information packet over a label switched path (LSP) between first and second end stations in a virtual private network (VPN) defined over a network arrangement of routers, the method comprising the step of:
attaching to the information packet at a network edge a sequence of labels indicative of a hierarchical arrangement of levels of paths, wherein a lowermost level of said hierarchical arrangement comprises a mesh of Layer 1 LSPs between adjacent routers, a next higher level of said hierarchical arrangement comprises a mesh of Layer 2 LSPs, each Layer 2 LSP comprising a concatenated sequence of Layer 1 LSPs, and wherein said LSP between the first and second end stations comprises an uppermost level of said hierarchical arrangement being specified by a pair of the Layer 2 LSPs;
wherein the hierarchical arrangement of levels of paths comprises a hierarchical arrangement of Quality of Service (QoS) capable Multi-Protocol Label Switch (MPLS) tunnels.

2. A method as claimed in claim 1, wherein each layer 2 LSP is a dynamic multiplex (DM) LSP.

3. A method as claimed in claim 2, wherein each Layer 2 LSP comprises a concatenated sequence of Layer 1 LSPs between a network edge router and a network central router.

4. A method as claimed in claim 3, wherein each network edge router comprises a local label switched router (LSR) and each central router comprises one of an international LSR node and a national tandem LSR.

5. A method as claimed in claim 3, wherein the pair of Layer 2 LSPs specifying the LSP between the first and second end stations comprises a first Layer 2 LSP between a network edge router serving the first end station and a central router and a second Layer 2 LSP between said central router and a network edge router serving the second end station, said central router connecting the two Layer 2 LSPs to form the LSP between the first and second end stations.

6. A method as claimed in claim 5, wherein the LSP between the first and second end stations comprises a session dynamically multiplexed onto said first and second Layer 2 LSPs, said session being switched between the first and second Layer 2 LSPs at the central router.

7. A method as claimed in claim 1, wherein the sequence of labels comprises four labels.

8. A method as claimed in claim 7, wherein the four labels include a label for a first Layer 2 LSP, a label for a second Layer 2 LSP, where said first and second Layer 2 LSPs specify the LSP between the first and second end stations, and a label for a first Layer 1 LSP from a network edge router serving the first end station to an adjacent router in the router network hosting the VPN.

9. A method as claimed in claim 1, wherein the Layer 1 and Layer 2 LSPs are established through one of RSVP Traffic Engineering Protocol and Constraint-Routed Label Distribution Protocol.

10. A method of forming an end to end label switched path (LSP) for packet transmission between first and second end stations in a virtual private network (VPN) defined over a network arrangement of routers, the method comprising the steps of:
establishing as a first, lower level in a hierarchical arrangement of levels of LSPs a mesh of Layer 1 LSPs between adjacent routers;
establishing as a next, higher level in said hierarchical arrangement a mesh of Layer 2 LSPs, each Layer 2 LSP comprising a concatenated sequence of Layer 1 LSPs;
specifying a pair of said Layer 2 LSPs as the end to end LSP between the first and second end stations, said end to end LSP comprising an uppermost level in said hierarchical arrangement; and
attaching to each packet to be transmitted over said end to end LSP a sequence of labels indicative of the hierarchical arrangement of levels of paths,
wherein the hierarchical arrangement of levels of LSPs comprises a hierarchical arrangement of Quality of Service (QoS) capable Multi-Protocol Label Switch (MPLS) tunnels.

11. A method as claimed in claim 10, wherein each layer 2 LSP is a dynamic multiplex (DM) LSP.

12. A method as claimed in claim 11, wherein each Layer 2 LSP comprises a concatenated sequence of Layer 1 LSPs between a network edge router and a network central router.

13. A method as claimed in claim 12, wherein each network edge router comprises a local label switched router (LSR) and each central router comprises one of an international LSR node and a national tandem LSR.

14. A method as claimed in claim 12, wherein the pair of Layer 2 LSPs specifying the end to end LSP between the first and second end stations comprises a first Layer 2 LSP between a network edge router serving the first end station and a central router and a second Layer 2 LSP between said central router and a network edge router serving the second end station, said central router connecting the two Layer 2 LSPs to form the LSP between the first and second end stations.

15. A method as claimed in claim 14, wherein the end to end LSP between the first and second end stations comprises a session dynamically multiplexed onto said first and second Layer 2 LSPs, said session being switched between the first and second Layer 2 LSPs at the central router.

16. A method as claimed in claim 15, wherein a new session is multiplexed onto said first and second Layer 2 LSPs only if resource constraints of said first and second Layer 2 LSPs are satisfied.

17. A method as claimed in claim 10, wherein the sequence of labels comprises four labels.

18. A method as claimed in claim 17, wherein the four labels include a label for a first Layer 2 LSP, a label for a second Layer 2 LSP, where said first and second Layer 2 LSPs specify the LSP between the first and second end stations, and a label for a first Layer 1 LSP from a network edge router serving the first end station to an adjacent router in the router network hosting the VPN.

19. A method as claimed in claim 10, wherein the Layer 1 and Layer 2 LSPs are established through one of RSVP Traffic Engineering Protocol and Constraint-Routed Label Distribution Protocol.

20. A method of forming an end to end label switched path (LSP) for packet transmission between first and second end stations in a virtual private network (VPN) defined over a network arrangement of routers, the method comprising the steps of:
  establishing as a first, lower level in a hierarchical arrangement of levels of LSPs a mesh of Layer 1 LSPs between adjacent routers;
  establishing as a next, higher level in said hierarchical arrangement a mesh of Layer 2 LSPs, each Layer 2 LSP comprising a concatenated sequence of Layer 1 LSPs;
  specifying a pair of said Layer 2 LSPs as the end to end LSP between the first and second end stations, said end to end LSP comprising an uppermost level in said hierarchical arrangement; and
  attaching to each packet to be transmitted over said end to end LSP a sequence of labels indicative of the hierarchical arrangement of levels of paths, wherein each layer 2 LSP is a dynamic multiplex (OM) LSP, wherein each Layer 2 LSP comprises a concatenated sequence of Layer 1 LSPs between a network edge router and a network central router, wherein the pair of Layer 2 LSPs specifying the end to end LSP between the first and send end stations comprises a first Layer 2 LSP between a network edge router serving the first end station and a central router and a second Layer 2 LSP between said central router and a network edge router serving the second end station, said central router connecting the two Layer 2 LSPs to form the LSP between the first and second end stations;
  wherein the step of specifying a pair of Layer 2 LSPs as the end to end LSP between the first and second end stations comprises the steps of:
  forwarding from a first media gateway associated with the first end station a number of candidate first Layer 2 LSPs to a second media gateway associated with the second end station, said candidate Layer 2 LSPs extending between the network edge router serving the first end station and the central router;
  at said second media gateway selecting one of a number of second Layer 2 LSPs, said selected second Layer 2 LSP extending between the central router and the network edge router serving the second end station; and
  returning from said second media gateway to said first media gateway control information pertaining to the pair of Layer 2 LSPs selected to establish the end to end LSP between the end stations.

21. A method as claimed in claim 20, wherein the control information comprises a sequence of LSP-identifiers (LSP-IDs).

22. A method as claimed in claim 21, wherein the sequence of LSP-IDs comprises four LSP-IDs consisting of a LSP-ID for a path between the first media gateway and the network edge router serving the first end station, a LSP-ID for a path between said network edge router and the central router, a LSP-ID for a path between the central router and the network edge router serving the second end station and a LSP-ID for a path from said network edge router and the second media gateway.

23. A method as claimed in claim 21, wherein the network edge router serving the first end station uses said sequence of LSP-IDs returned by the second media gateway to define a label stack for each packet transmitted on the end to end LSP, wherein said label stack includes a label for a first Layer 2 LSP, a label for a second Layer 2 LSP, where said first and second Layer 2 LSPs specify said end to end LSP between the first and second end stations, and a label for a first Layer 1 LSP from said network edge router to an adjacent router in the router network hosting the VPN.

24. A method of selecting a series of tunnels between a source edge label switched router (LSR) and a destination edge LSR to form an end to end label switched tunnel between said source and destination edge LSRs, said LSRs belonging to a network arrangement of LSRs, the network arrangement of LSRs including a plurality of network central LSRs, the method comprising the steps of:
  at the source edge LSR determining resource availability by identifying a candidate list of first Layer 2 tunnels extending from the source edge LSR to any of the plurality of central LSRs, said first Layer 2 tunnels each comprising a concatenated sequence of Layer 1 label switched tunnels connecting adjacent LSRs in a mesh of LSRs including the source edge LSR, intermediate LSRs and the plurality of central LSRs;
  forwarding the candidate list to the destination LSR;
  at the destination LSR, identifying any second Layer 2 tunnels extending from any of the central LSRs to the destination edge LSR that satisfies a connection condition that the identified second Layer 2 tunnel meets one of said first Layer 2 tunnels at one of said central LSRs; and
  selecting a pair of the Layer 2 tunnels, one from the candidate list of first Layer 2 tunnels and one of the second Layer 2 tunnels that satisfies the connection condition, to form an end to end label switched tunnel between the source and destination edge LSRs.

25. A method as claimed in claim 24, wherein each layer 2 tunnel is a dynamic multiplex (DM) LSP.

26. A method as claimed in claim 24, wherein the end to end tunnel between the source and destination edge LSRs comprises a session dynamically multiplexed onto said first and second Layer 2 tunnels, said session being switched between the first and second Layer 2 tunnels at the central LSR at which said Layer 2 tunnels meet.

27. A method at claimed in claim 26, wherein a new session is multiplexed onto said end to end tunnel only if resource constraints of said first and second Layer 2 tunnels comprising the end to end tunnel are satisfied.

28. A method as claimed in claim 24, wherein the Layer 2 tunnels comprise Multi-Protocol Label Switch (MPLS) tunnels.

29. A method as claimed in claim 28, wherein the Layer 1 tunnels comprise MPLS tunnels that have static reservation.

30. A method as claimed in claim 24, wherein the Layer 1 and Layer 2 tunnels are established through one of RSVP Traffic Engineering Protocol and Constraint-Routed Label Distribution Protocol.

31. A method as claimed in claim 24, wherein a label stack comprising a sequence of labels is attached to each packet transmitted on the end to end tunnel, said labels identifying at least the Layer 2 tunnels comprising the end to end tunnel.

32. A method as claimed in claim 31, wherein the sequence of labels comprises four labels.

33. A method as claimed in claim 32, wherein the four labels include a label for a first Layer 2 tunnel, a label for a second Layer 2 tunnel, where said first and second Layer 2 tunnels specify the end to end tunnel between the source and destination edge LSRs, and a label for a first Layer 1 tunnel from the source edge LSR to an adjacent LSR in the LSR network.

34. A method as claimed in claim 24, wherein the destination edge LSR returns control information to the source edge LSR comprising a sequence of LSP-identifiers (LSP-IDs) identifying the pair of Layer 2 tunnels selected to form the end to end tunnel.

35. A method as claimed in claim 34, wherein the sequence of LSP-IDs comprises four LSP-IDs consisting of a LSP-ID for a path between a first media gateway and the source edge LSR, a LSP-ID for a path between said source edge LSR and a central LSR, a LSP-ID for a path between the central LSR and the destination edge LSR and a LSP-ID from said destination edge LSR and a second media gateway.

36. A method as claimed in claim 35, wherein the source edge LSR uses said sequence of LSP-IDs to define a label stack for each packet transmitted on the end to end tunnel, wherein said label stack includes a label for the first Layer 2 tunnel, a label for the second Layer 2 tunnel, and a label for a first Layer 1 tunnel from said source edge LSR to an adjacent LSR in the mesh of LSRs.

37. A system for forming an end to end label switched path (LSP) for packet transmission between first and second end stations in a virtual private network (VPN) defined over a network arrangement of routers, the system comprising:
a management system for establishing as a first, lower level in a hierarchical arrangement of levels of LSPs a mesh of Layer 1 LSPs between adjacent routers, said management system also establishing as a next, higher level in said hierarchical arrangement a mesh of Layer 2 LSPs, each Layer 2 LSP comprising a concatenated sequence of Layer 1 LSPs, and specifying a pair of said Layer 2 LSPs as the end to end LSP between the first and second end stations, said end to end LSP comprising an uppermost level in said hierarchical arrangement; and
a network edge router associated with the first end station for attaching to each packet to be transmitted over said end to end LSP a sequence of labels indicative of the hierarchical arrangement of levels of LSPs;
wherein the hierarchical arrangement of levels of LSPs comprises a hierarchical arrangement of Quality of Service (QoS) capable Multi-Protocol Label Switch (MPLS) tunnels.

38. A system as claimed in claim 37, wherein the management system is arranged to form each layer 2 LSP as a dynamic multiplex (DM) LSP.

39. A system as claimed in claim 38, wherein the management system is arranged to form each Layer 2 LSP as a concatenated sequence of Layer 1 LSPs between the network edge router and a network central router.

40. A system as claimed in claim 39, wherein each network edge router comprises a local label switched router (LSR) and each central router comprises one of an international LSR node and a national tandem LSR.

41. A system as claimed in claim 39, wherein the management system is arranged to select the pair of Layer 2 LSPs specifying the end to end LSP between the first and second end stations as comprising a first Layer 2 LSP between the network edge router serving the first end station and a central router and a second Layer 2 LSP between said central router and a network edge router serving the second end station, said central router connecting the two Layer 2 LSPs.

42. A system as claimed in claim 41, wherein the management system is arranged to dynamically multiplex a session onto said first and second Layer 2 LSPs, said session being switched between the first and second Layer 2 LSPs at the central router, thereby forming the end to end LSP.

43. A system as claimed in claim 37, wherein network edge router is arranged to attach four labels to each packet.

44. A system as claimed in claim 43, wherein the four labels include a label for a first Layer 2 LSP, a label for a second Layer 2 LSP, where said first and second Layer 2 LSPs specify the LSP between the first and second end stations, and a label for a first Layer 1 LSP from a network edge router serving the first end station to an adjacent router in the router network hosting the VPN.

45. A system as claimed in claim 44, wherein the management system is arranged to establish the Layer 1 and Layer 2 LSPs through one of RSVP Traffic Engineering Protocol and Constraint-Routed Label Distribution Protocol.

46. A system as claimed in claim 44, comprising a first media gateway associated with the first end station for forwarding a number of candidate first Layer 2 LSPs to a second media gateway associated with the second end station, said candidate first Layer 2 LSPs extending between the network edge router serving the first end station and the central router; said second media gateway being arranged to select one of a number of second Layer 2 LSPs, said selected second Layer 2 LSP extending between the central router and the network edge router serving the second end station, and to return to said first media gateway control information pertaining to the pair of Layer 2 LSPs selected to establish the end to end LSP between the end stations.

47. A system as claimed in claim 46, wherein the control information comprises a sequence of LSP-identifiers (LSP-IDs).

48. A system as claimed in claim 46, wherein the sequence of LSP-IDs comprises four LSP-IDs consisting of a LSP-ID for a path between the first media gateway and the network edge router serving the first end station, a LSP-ID for a path between said network edge router and the central router, a LSP-ID for a path between the central router and the network edge router serving the second end station and a LSP-ID for a path from said network edge router and the second media gateway.

49. A system as claimed in claim 46, wherein the network edge router serving the first end station uses said sequence of LSP-IDs returned by the second media gateway to define a label stack for each packet transmitted on the end to end LSP, wherein said label stack includes a label for a first Layer 2 LSP, a label for a second Layer 2 LSP, where said first and second Layer 2 LSPs specify said end to end LSP between the first and second end stations, and a label for a first Layer 1 LSP from said network edge router to an adjacent router in the router network hosting the VPN.

50. A system as claimed in claim 49, wherein each layer 2 tunnel is a dynamic multiplex (DM) LSP.

51. A system as claimed in claim 49, wherein the end to end tunnel between the source and destination edge LSRs comprises a session dynamically multiplexed onto said first and second Layer 2 tunnels, said session being switched between the first and second Layer 2 tunnels at the central LSR at which said Layer 2 tunnels meet.

52. A system as claimed in claim 51, wherein a new session is multiplexed onto said end to end tunnel only if resource constraints of said first and second Layer 2 tunnels comprising the end to end tunnel are satisfied.

53. A system for selecting a series of tunnels to form an end to end label switched tunnel across a communications network comprising:
- a router network including a source edge label switched router (LSR), a plurality of central LSRs and a destination edge LSR; wherein
- said source edge LSR is arranged to determine resource availability by identifying a candidate list of first Layer 2 tunnels extending from said source edge LSR to any of the plurality of central LSRs, said first Layer 2 tunnels each comprising a concatenated sequence of Layer 1 label switched tunnels connecting adjacent LSRs in a mesh of LSRs including the source edge LSR, intermediate LSRs and the plurality of central LSRs, and to forward the candidate list to the destination LSR;
- said destination LSR being arranged to Identify any second Layer 2 tunnels extending from any of the central LSRs to the destination edge LSR that satisfies a connection condition that the identified second Layer 2 tunnel meets one of said first Layer 2 tunnels at one of said central LSRs; and to select a pair of the Layer 2 tunnels, one from the candidate list of first Layer 2 tunnels and one of the second Layer 2 tunnels that satisfies the connection condition, to form said end to end label switched tunnel between the source and destination edge LSRs.

54. A system as claimed in claim 53, wherein the Layer 2 tunnels comprise Multi-Protocol Label Switch (MPLS) tunnels.

55. A system as claimed in claim 54, wherein the Layer 1 tunnels comprise MPLS tunnels that have static reservation.

56. A system as claimed in claim 53, wherein the Layer 1 and Layer 2 tunnels are established through one of RSVP Traffic Engineering Protocol and Constraint-Routed Label Distribution Protocol.

57. A system as claimed in claim 53, wherein the source edge LSR is arranged to attach a label stack comprising a sequence of labels to each packet transmitted on the end to end tunnel, said labels identifying at least the Layer 2 tunnels comprising the end to end tunnel.

58. A system as claimed in claim 57, wherein the sequence of labels comprises four labels.

59. A system as claimed in claim 58, wherein the four labels include a label for a first Layer 2 tunnel, a label for a second Layer 2 tunnel, where said first and second Layer 2 tunnels specify the end to end tunnel between the source and destination edge LSRs, and a label for a first Layer 1 tunnel from the source edge LSR to an adjacent LSR in the LSR network.

60. A system as claimed in claim 53, wherein the destination edge LSR is arranged to return control information to the source edge LSR comprising a sequence of LSP-identifiers (LSP-IDs) identifying the pair of Layer 2 tunnels selected to form the end to end tunnel.

61. A system as claimed in claim 60, wherein the sequence of LSP-IDs comprises four LSP-IDs consisting of a LSP-ID for a path between a first media gateway and the source edge LSR, a LSP-ID for a path between said source edge LSR and a central LSR, a LSP-ID for a path between the central LSR and the destination edge LSR and a LSP-ID from said destination edge LSR and a second media gateway.

62. A system as claimed in claim 61, wherein the source edge LSR uses said sequence of LSP-IDs to define a label stack for each packet transmitted on the end to end tunnel, wherein said label stack includes a label for the first Layer 2 tunnel, a label for the second Layer 2 tunnel, and a label for a first Layer 1 tunnel from said source edge LSR to an adjacent LSR in the mesh of LSRs.

* * * * *